US007502883B2

(12) United States Patent
Lunecki et al.

(10) Patent No.: US 7,502,883 B2
(45) Date of Patent: Mar. 10, 2009

(54) USB INTEGRATED MODULE

(75) Inventors: Daniel Kenneth Lunecki, Austin, TX (US); Douglas R. Holberg, Wimberley, TX (US)

(73) Assignee: Silicon Labs CP, Inc., Austin, TX (US)

( * ) Notice: Subject to any disclaimer, the term of this patent is extended or adjusted under 35 U.S.C. 154(b) by 245 days.

(21) Appl. No.: 10/625,580

(22) Filed: Jul. 23, 2003

(65) Prior Publication Data

US 2005/0020144 A1 Jan. 27, 2005

(51) Int. Cl.
*G06F 13/14* (2006.01)

(52) U.S. Cl. ...................................... 710/305; 710/306

(58) Field of Classification Search ......... 710/305-306, 710/313, 11, 100; 439/68-69
See application file for complete search history.

(56) References Cited

U.S. PATENT DOCUMENTS 5,446,696 A * 8/1995 Ware et al. .................. 365/222
5,675,813 A * 10/1997 Holmdahl ................... 713/310
5,841,996 A * 11/1998 Nolan et al. ................ 710/305
6,189,052 B1 * 2/2001 Nilsson et al. ................ 710/48
6,307,538 B1 * 10/2001 Bacon ........................ 345/163
6,733,329 B2 * 5/2004 Yang .......................... 439/518
6,862,648 B2 * 3/2005 Yatziv ........................ 710/315
6,904,488 B2 * 6/2005 Matsumoto et al. ......... 710/313
6,917,658 B2 * 7/2005 Fernald ...................... 375/355
2003/0046472 A1 * 3/2003 Morrow ...................... 710/305

* cited by examiner

*Primary Examiner*—Clifford H Knoll
*Assistant Examiner*—Kim T Huynh
(74) *Attorney, Agent, or Firm*—Howison & Arnott, L.L.P.

(57) ABSTRACT

USB integrated module. A modularized serial data module is disclosed for interfacing with a serial data line operating in accordance with a first serial data protocol that transmits/receives data and also provides power to the modularized serial data module. The module includes a connector housing for providing a physical interface with the serial data line. A processor housing is disposed adjacent the connector housing and operable to interface therewith. A processor is disposed within the processor housing and operable to be powered by the serial data line through the connector housing and is also operable to interface with the data portion of the serial data line through the connector housing. The processor is operable to provide processing of information based upon data received from the serial data line through the connector housing or processing of information for transmission to the serial data line through the connector housing.

25 Claims, 7 Drawing Sheets

USB INTEGRATED MODULE

TECHNICAL FIELD OF THE INVENTION

The present invention pertains in general to a Universal Serial Bus (USB) serial data interface and, more particularly, to a modularized USB interface that contains processing capability for interfacing a USB connector to other peripheral devices.

CROSS-REFERENCE TO RELATED APPLICATIONS

This application is related to pending U.S. patent application Ser. No. 10/244,728, filed Sep. 16, 2002, entitled "CLOCK RECOVERY METHOD FOR BURSTY COMMUNICATIONS," which is incorporated herein by reference.

BACKGROUND OF THE INVENTION

The serial data bus has seen widespread and ever increasing acceptance and use in the PC industry as compared to the parallel data bus. In early computers, although there was provided both a serial data interface and a parallel data interface, the parallel data interface was preferred over the serial data interface due primarily to the speed difference, this due to the fact that the data is transferred in a parallel manner. However, this parallel interface required more wires, a bulkier connector and cable, etc., whereas the serial data interfaces required smaller connectors and smaller cables. However, of course, the serial data interface transfers only a single bit of data at a time. Therefore, it is inherently slower.

To increase the speed of serial data transfer, various serial data protocols were examined. One of these was the "fire-wire" configuration, and one was the Universal Serial Bus (USB) configuration. Although fire-wire was considered to be far superior to USB, the USB interface became more popular. One of the reasons for this is the fact that it actually provides power to the peripheral device. Initially, this was not an advantage but, with later advances in such things as flash memory and low power peripheral devices, the delivery of power to a peripheral device through a Serial Data Interface became more practical. The USB interface provided this capability with up to 500 milliamps of current being made available, this providing both power in association with a serial data interface, which opened up a number of avenues for many peripheral devices. All that was required to interface with most peripheral devices on the computer was to have a USB interface. However, in order to interface the USB port on various peripheral devices with a mother board, for example, there is required some type of processing to convert the data between the serial data interface protocol and the data bus format on the mother board. The data transfer is typically what is referred to as "asynchronous" such that some type of clock synchronization is required to extract the data from a received data stream and determine a relationship between the timing of the received serial data and the timing of the mother board data, in a PC example.

In order to more easily facilitate the use of the USB with conventional devices, there have been developed certain improvements. One of these is to provide a modularized USB interface in the form of a PMCIA card. This card provides, in one example, two USB connectors of the male type on a card with a processor that allows the module to be plugged into the PMCIA slot in a computer. The PMCIA card contains thereon the necessary USB processing capability, which is powered by the computer once the PMCIA card is plugged into the PMCIA slot, this also providing power to the USB connectors.

There also provided USB modules that have disposed on board flash memory that is powered by the USB connector from the PC. These modules contain both the processing power to interface with the USB connector and the flash memory. There are also similar modules that have removable memory cards in place of the flash memories.

SUMMARY OF THE INVENTION

The present invention disclosed and claimed herein, in one aspect thereof, comprises a modularized serial data module for interfacing with a serial data line operating in accordance with a serial data protocol that transmits/receives data and also provides power to the modularized serial data module. The module includes a connector housing for providing a physical interface with the serial data line. A processor housing is disposed adjacent the connector housing and operable to interface therewith. A processor is disposed within the processor housing and operable to be powered by the serial data line through the connector housing and is also operable to interface with the data portion of the serial data line through the connector housing. The processor is operable to provide processing of information based upon data received from the serial data line through the connector housing or processing of information for transmission to the serial data line through the connector housing.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
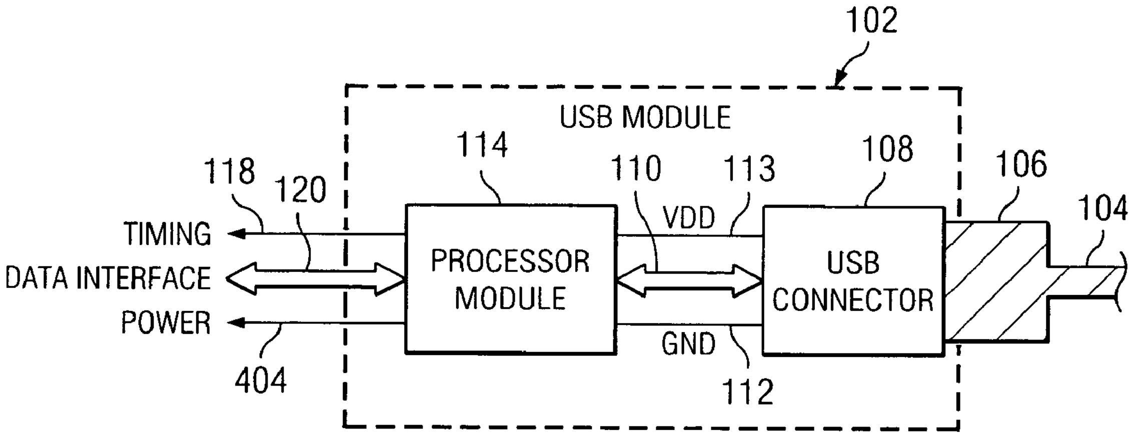
FIG. 1 illustrates an overall diagrammatic view of the USB module.

Referring now to FIG. 1, there is illustrated a block diagram of a self contained USB module 102 that is provided to interface between a USB cable 104 that has associated therewith a female USB connector 106. The USB module 102 contains thereon a male USB connector 108 that is operable to provide a receptacle for receiving the USB connector 106. The USB connector 108 has a number of different configurations that are standardized. They can be an A-type receptacle, a B-type receptacle and the mini-B receptacle or the mini-A receptacle, in addition to the mini A-B receptacle. These are all standard configurations. As will be described herein below, in general, each of the USB connectors provides a positive supply connector, a ground connector, a data connector, a data line and a clock line. The cable 104 provides power to the USB connector, and data and clock information is output from the USB connector 108 on a data/clock bus 110, it being understood that there is typically only a single data line for data transmission in any one direction of serial data, and only one clock line is needed. There is provided a ground line 112 and a power supply line 113. Typically, the current provided on power supply line 113 is limited to around 500 milliamps.

The data/clock information on bus 110 and the ground and power supply on lines 112 and 113 are all provided to a processor module 114. The processor module 114, as will be described in more detail herein below, is operable to be powered by the power supply line 114 to process the data received in the USB format in accordance with various process algorithms associated with the processor module 114. This processor module 114 utilizes the functionality of part no. C8051F32X, which is manufactured by Cygnal Integrated Products. This processor module 114 has a plurality of configurations, which allows the processor module 114 to be configured, in one configuration, to receive analog data, convert it to digital data and then transmit it to USB connector 108, and, in another configuration, convert digital data to analog data and transmit the analog data from the processor module 114 and, in yet another configuration, interface the processor module 114 with another peripheral device either through a serial port or through a parallel port. For example, the processor module 114 could convert the serial data from the USB format to another serial data format such as SMB or $I^2C$. The timing information from the processor module 114 can be provided on a timing interface 118 outside of the module 102 and data can be provided to a data interface 120 from processor module 114. Additionally, as will be described herein below, the processor module 114 could have contained therein a transducer interface to the exterior of the module 102. Module 102 will typically have some type of shielding disposed around at least the USB connector 108, if not the entire module. The module 102, as set forth, will allow data to be received on the USB side thereof and communicate on the other side thereof in a format other than USB and, in one embodiment described herein below, provide power to the other or non-USB side.

Figure 2:
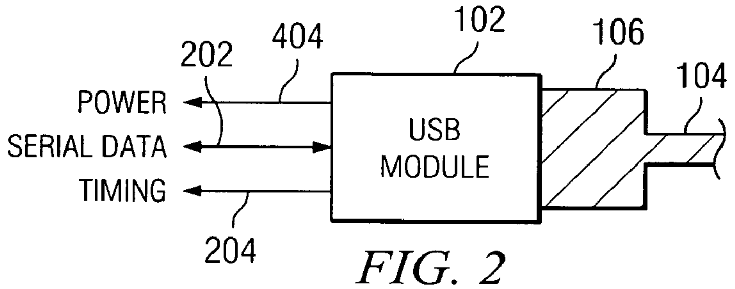
FIGS. 2-4 illustrate alternate embodiments of the USB module.

Referring now to FIG. 2, there is illustrated a diagrammatic view of one example of the use of the USB module 102. The USB module 102 in FIG. 2 is configured to provide a serial data bus interface. Thus, the data interface exterior to the module 102 will be a serial data string on a serial data line 202 that can transmit data and/or receive data. This could be a transmit only configuration, a receive only configuration or a bi-directional configuration. In addition, timing information can be provided on a timing clock line 204. Such serial data protocols as $I^2C$, as one example, require both data and timing. Such a data interface is illustrated in U.S. Pat. No. 4,689,740. Further, there are Serial Data Interfaces that do not require timing, one such interface described in U.S. Pat. No. 5,210,846, which are both incorporated herein by reference. Further, other types of asynchronous serial data formats that do not require timing but require clock recovery are those such as Manchester coded PSK. These, of course, only require a single data line. One such data interface is illustrated in U.S. Pat. No. 4,621,190.

Figure 3:
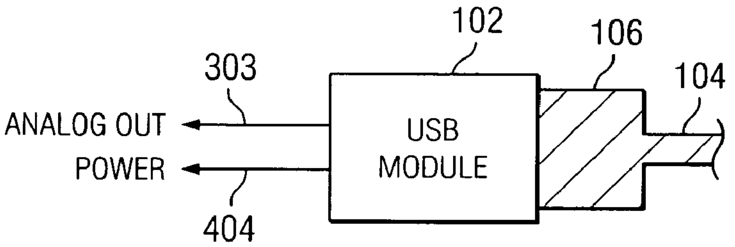

Referring now to FIG. 3, there is illustrated an alternate embodiment of the use of the USB module 102, wherein only analog information is output on an analog line 303. The USB module 102 can, therefore, receive serial data, utilize the serial data to generate, in one embodiment, analog data on the output. Additionally, the data could be utilized to control some process within the USB module 102 that will provide an analog output as an alarm signal, for example, a process output, etc.

Figure 4:
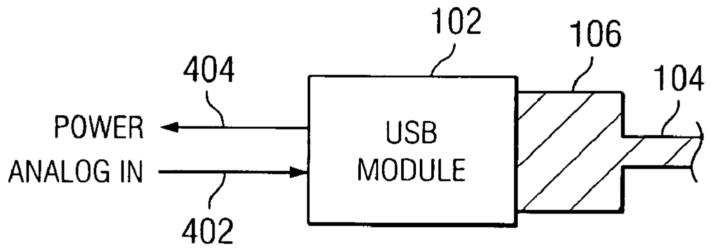

Referring now to FIG. 4, there is illustrated an alternate embodiment to that of FIG. 3 wherein the data interface 120 comprises simply an analog input. This could be utilized for instrumentation on an analog input on a line 402. This could be utilized in an instrumentation environment wherein a transducer input were received, processed in the USB module 102 and then data resulting from the process transmitted to the connector 106. This could be as simple as converting the analog data to digital data and transmitting that digital data or, alternatively, receiving the analog data, subjecting it to an internal algorithm to compute some resultant vector and then transmission of this resultant vector to the connector 106 for transmission to another device. Additionally, although not shown, the USB module 102 can actually provide power on a line 404 to any peripheral device.

Figure 5:
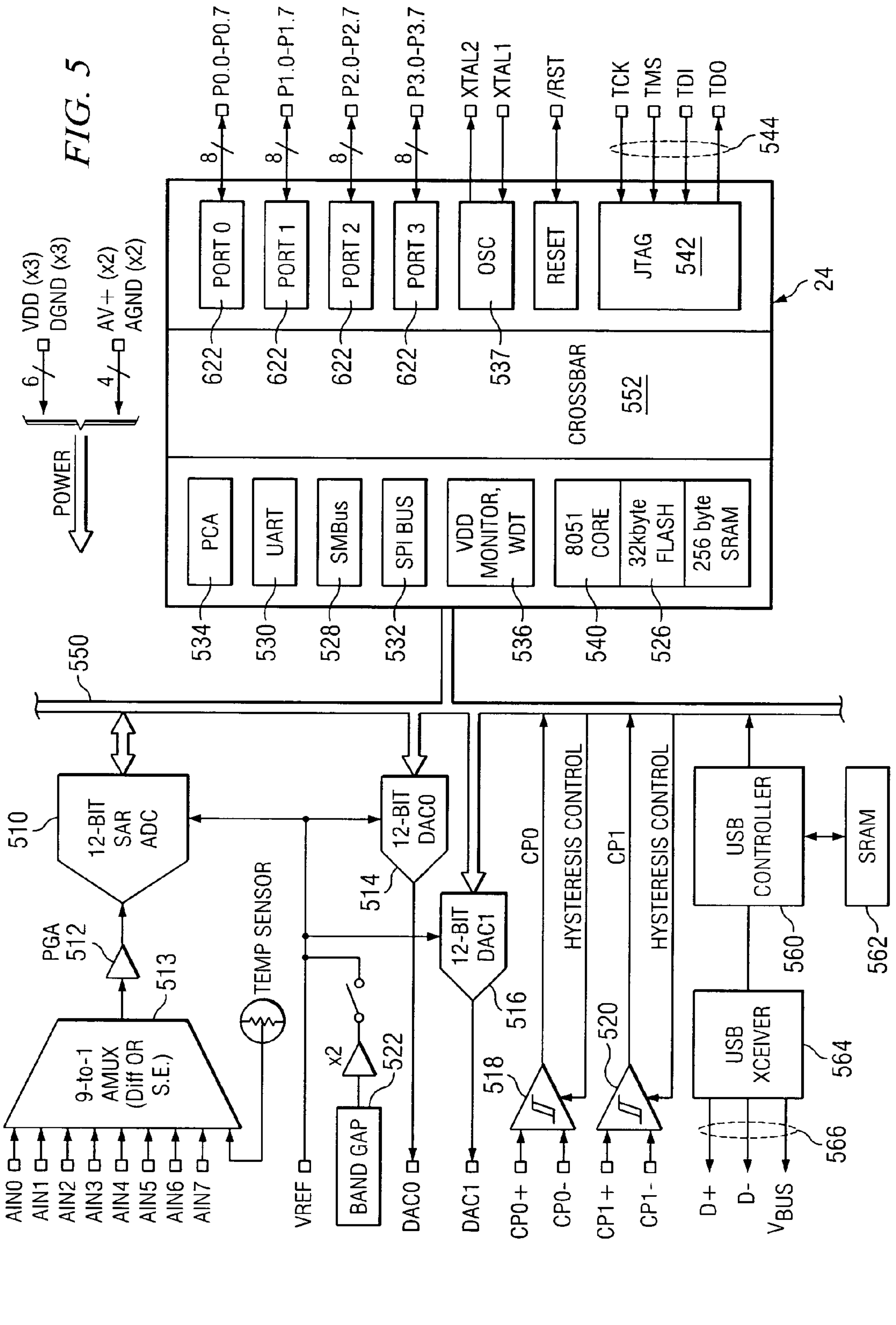
FIG. 5 illustrates an overall block diagram of a mixed-signal integrated circuit utilizing a USB port.

Referring now to FIG. 5, there is illustrated an integrated circuit that provides the functionality of the processor module 114, that is comprised of a fully integrated mixed-signal System on a Chip with a true 12-bit multi-channel ADC 510 with a programmable gain pre-amplifier s12, two 12-bit DACs 514 and 516, two voltage comparators 518 and 520, a voltage reference 22, and an 8051-compatible microcontroller core 524 with 32 kbytes of FLASH memory 526. There is also provided an I2C/SMBUS 528, a UART 530, and an SPI 532 serial interface 540 implemented in hardware (not "bit-banged" in user software) as well as a Programmable Counter/Timer Array (PCA) 534 with five capture/compare modules. There are also 32 general purpose digital Port I/Os. The analog side further includes a multiplexer 513 as operable to interface eight analog inputs to the programmable amplifier 512 and to the ADC 510.

With an on-board $V_{DD}$ monitor 536, WDT, and clock oscillator 537, the integrated circuit is a stand-alone System on a Chip. The MCU effectively configures and manages the analog and digital peripherals. The FLASH memory 526 can be reprogrammed in-circuit, providing non-volatile data storage, and also allowing field upgrades of the 8051 firmware. The MCU can also individually shut down any or all of the peripherals to conserve power.

A JTAG interface 542 allows the user to interface with the integrated circuit through a conventional set of JTAG inputs 544. On-board JTAG debug support allows non-intrusive (uses no on-chip resources), full speed, in-circuit debug using the production integrated circuit installed in the final application. This debug system supports inspection and modification of memory and registers, setting breakpoints, watch points, single stepping, run and halt commands. All analog and digital peripherals are fully functional when debugging using JTAG.

The microcontroller 540 is fully compatible with the MCS-51™ instruction set. Standard 803x/805x assemblers and compilers can be used to develop software. The core has all the peripherals included with a standard 8052, including three 16-bit counter/timers, a full-duplex UART, 656 bytes of internal RAM, 128 byte Special Function Register (SFR) address space, and four byte-wide I/O Ports. A Universal Serial Bus (USB) interface is provided with a controller 560 that interfaces with memory 562 (of which all or a portion may be on the integrated circuit with the controller 560) and a USB transceiver 564. The transceiver 564 will interface with dedicated pins 566 to receive/transmit serial data. This data is referred to as "bursty communications."

Referring further to FIG. 5, the core 541 is interfaced through an internal BUS 550 to the various input/output blocks. A cross-bar switch 552 provides an interface between the UART 530, SPI BUS 532, etc., and the digital I/O output. This is a configurable interface.

The core 540 employs a pipelined architecture that greatly increases its instruction throughput over the standard 8051 architecture. In a standard 8051, all instructions except for MUL and DIV take 12 or 24 system clock cycles to execute with a maximum system clock of 12 MHz. By contrast, the core 540 executes seventy percent (70%) of its instructions in one or two system clock cycles, with only four instructions taking more than four system clock cycles. The core 540 has a total of 509 instructions. The number of instructions versus the system clock cycles to execute them is as follows:

| | Instructions | | | | | | | | |
|---|---|---|---|---|---|---|---|---|---|
| | 26 | 50 | 5 | 14 | 7 | 3 | 1 | 2 | 1 |
| Clocks to Execute | 1 | 2 | 2/3 | 3 | 3/4 | 4 | 4/5 | 5 | 8 |

With the core 540's maximum system clock at 20 MHz, it has a peak throughput of 20 MIPS.

As an overview to the system of FIG. 5, the cross-bar switch 552 can be configured to interface any of the ports of the I/O side thereof to any of the functional blocks 528, 530, 532, 534 or 536 which provide interface between the cross-bar switch 552 and the core 540. Further, the cross-bar switch can also interface through these functional blocks 528-536 directly to the BUS 550.

Figure 6:
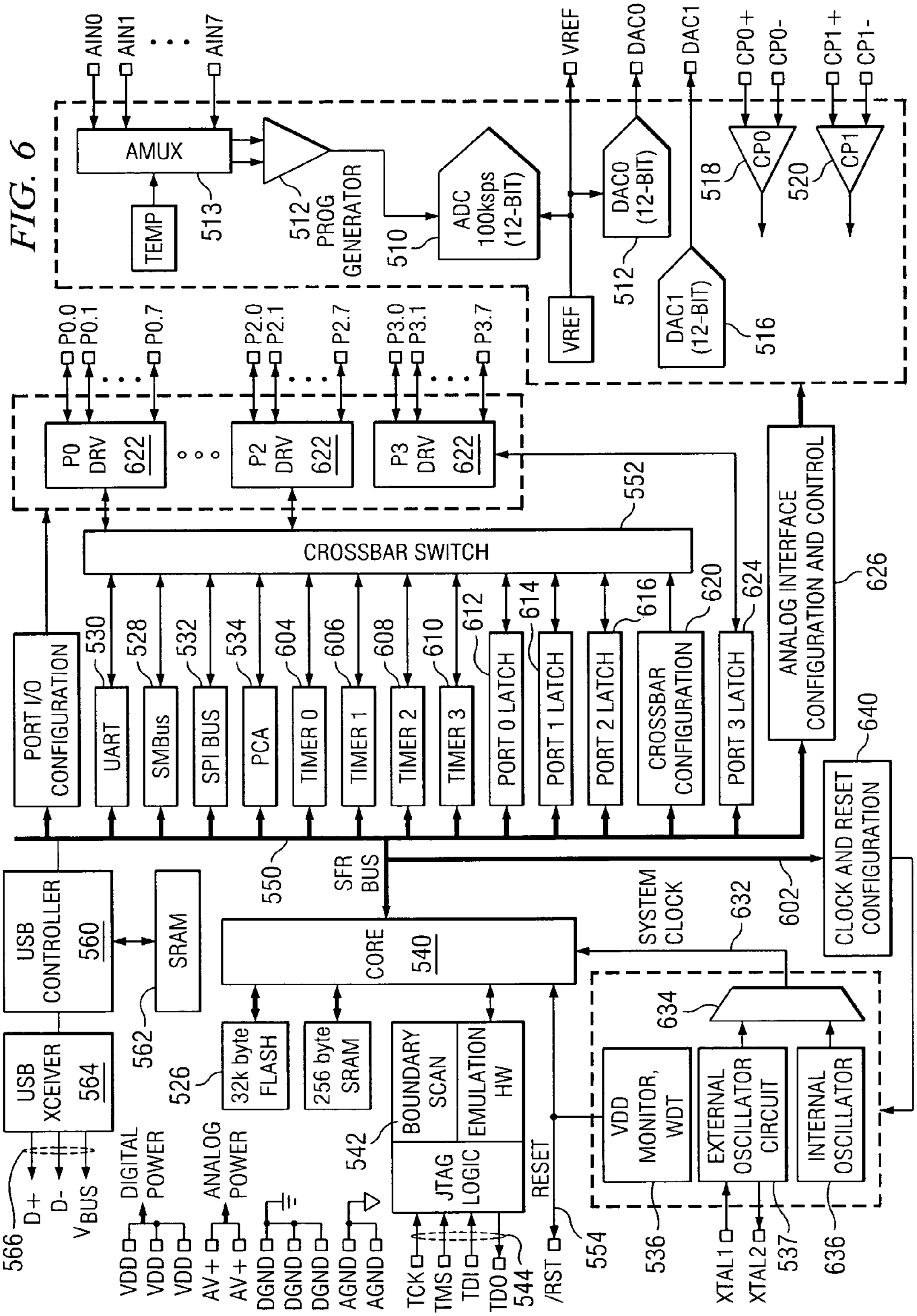
FIG. 6 illustrates a more detailed diagram of the integrated circuit of FIG. 5.

Referring now to FIG. 6, there is illustrated a more detailed block diagram of the integrated circuit FIG. 5. In this embodiment, it can be seen that the cross-bar switch 552 actually interfaces to a system BUS 602 through the BUS 550. The BUS 550 is operable to allow core 540 to interface with the various functional blocks 528-534 in addition to a plurality of timers 604, 606, 608 and 610, in addition to three latches 612, 614 and 616. The cross-bar switch 552 is configured with a configuration block 620 that is configured by the core 540. The other side of the cross-bar switch 552, the I/O side, is interfaced with various port drivers 622, which is controlled by a port latch 624 that interfaces with the BUS 550. In addition, the core 540 is operable to configure the analog side with an analog interface configuration in control block 626.

The core 540 is controlled by a clock on a line 632. The clock is selected from, as illustrated, one of two locations with a multiplexer 634. The first is external oscillator circuit 537 and the second is an internal oscillator 636. The internal oscillator circuit 636 is a precision temperature compensated oscillator, as will be described herein below. The core 540 is also controlled by a reset input on a reset line 554. The reset signal is also generated by the watchdog timer (WDT) circuit 536, the clock and reset circuitry all controlled by clock and reset configuration block 640, which is controlled by the core 540. Therefore, it can be seen that the user can configure the system to operate with an external crystal oscillator or an internal precision non-crystal non-stabilized oscillator that is basically "free-running." This oscillator 636, as will be described herein below, generates the timing for both the core 540 and for the UART 530 timing and is stable over temperature.

The description of the precision oscillator 636 is described in U.S. patent application Ser. No. 10/244,728, filed Sep. 16, 2002 and entitled "CLOCK RECOVERY METHOD FOR BURSTY COMMUNICATIONS", which is incorporated by reference in its entirety.

The processor housing portion of each of the modules noted herein utilizes a processor that can interface with an asynchronous data protocol such as a USB data protocol without requiring a crystal. This is due to the fact that the processor has disposed thereon a precision oscillator that can track a frequency close enough that it does not require a crystal time base. By not requiring a crystal time base, a much more compact configuration can be provided.

Figure 7:
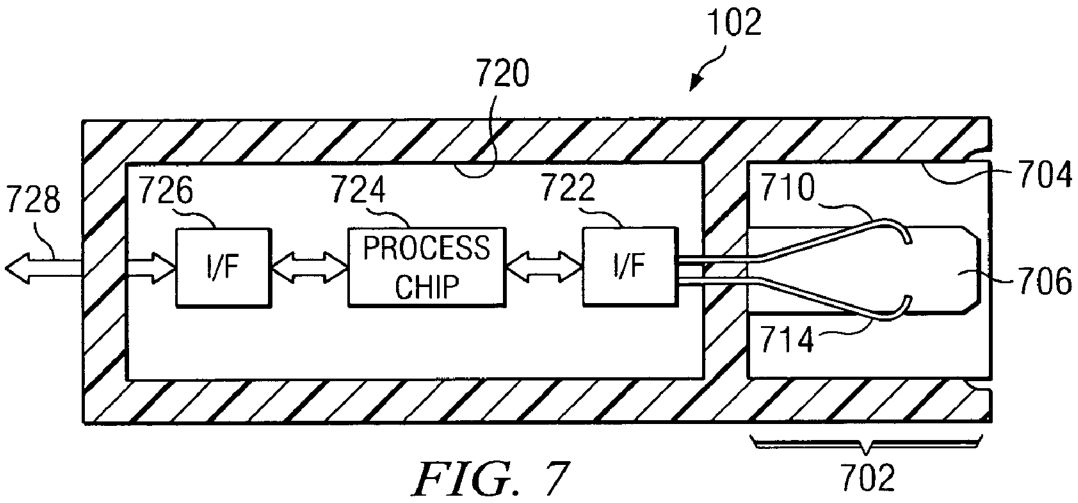
FIGS. 7-8 illustrate cross-sectional views of the USB module shown in different configurations of how the processor chip is interfaced with the USB connecter.
Figure 12:
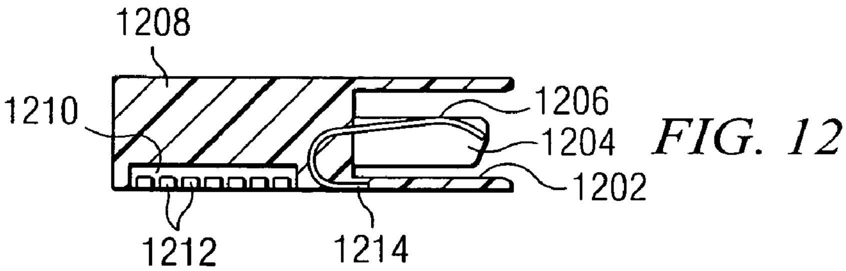
FIG. 12 illustrates a series mini-B USB receptacle with a leadless surface mount.

Referring now to FIG. 7, there is illustrated a cross-sectional view of the USB module 102. In the embodiment of FIG. 12, the module includes a USB connector region 702 which is of a conventional configuration. In the conventional configuration, there is provided a cavity 704 within which is disposed a protrusion member 706. This is the support member for supporting the conductive pins, of which two are shown, pins 710 and 714, disposed on opposite sides of the protrusion 706. Since they are shown in the side view, it should be understood that there are multiple pins or contacts on either side of the protrusion 706, depending upon the configuration and the style of pin. As it is noted that there are a number of different pin configurations depending upon whether the USB connector is an A-type connector or a B-type connector or whether it is a "mini" version thereof. In general, however, the minimum pin count required is a ground, a positive supply voltage and a data line.

The pins 710 and 714 extend into a processor cavity portion 720, which contains an interface 722 that interfaces between the pins 710 and 714 (noting that only two pins are shown, although there are more) and a processor chip 724, which contains the functionality of the processor module 114. The processor chip 724 is then interfaced through an interface block 726 with an interface bus 728 exterior to the processor cavity 720. It is noted that the processor chip 724 is powered by power provided to the USB connector portion 702, this power converted through the interface 722. The interface 726 can now input data, receive data and output power.

Figure 8:
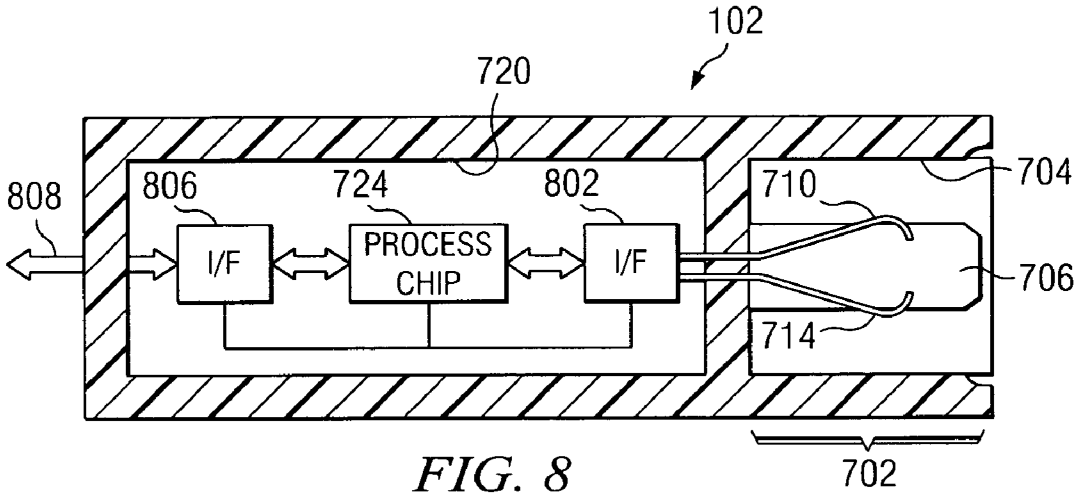

Referring now to FIG. 8, there is illustrated an alternate embodiment of the embodiment of FIG. 7. In this embodiment, there is provided an interface 802 that interfaces data and power to the processor chip 724 and also interfaces power to an interface 806 that is operable to interface data from the processor chip 724 to an external interface bus 808 and also interface power to the interface 806, such that the interface 806 can utilize the power for the internal operations thereof or can interface the power external to the USB module 102.

Figure 9:
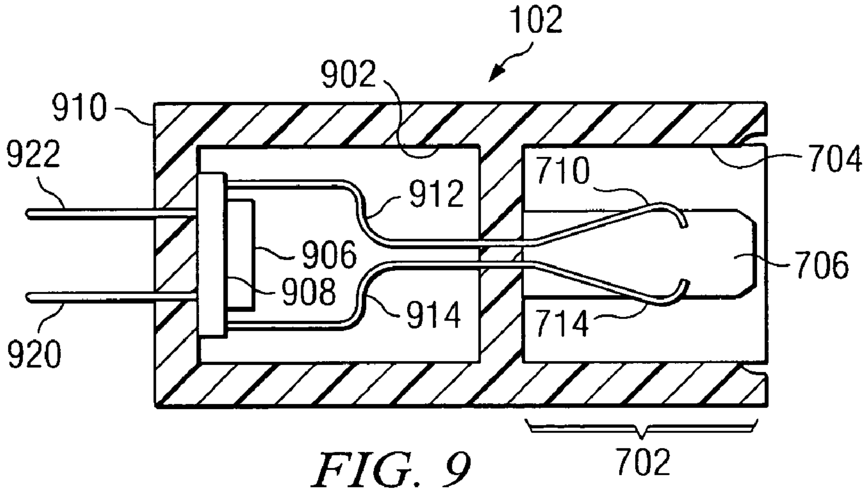
FIG. 9 illustrates a cross-sectional view of an alternate embodiment of the USB module.

Referring now to FIG. 9, there is illustrated an alternate embodiment of the USB module 102. In this embodiment, the connector portion 702 and pins 710 and 714 interface with a processor cavity 902. Processor cavity 902 is configured such that a processor chip 906 is disposed on a PC board 908 against a back wall 910 of the processor cavity 902. The PC board 906 is operable to interface with the pins 710 and 714 through leads 912 and 914, respectively. This allows power to be provided to the PC board 908, which power can then be routed through circuit board connections (not shown) on the PC board 908. There will be provided interface pins 920 and 922 (it being noted that there can be more interface pins than illustrated) when interfacing exterior to the USB module 102.

Figure 10A:
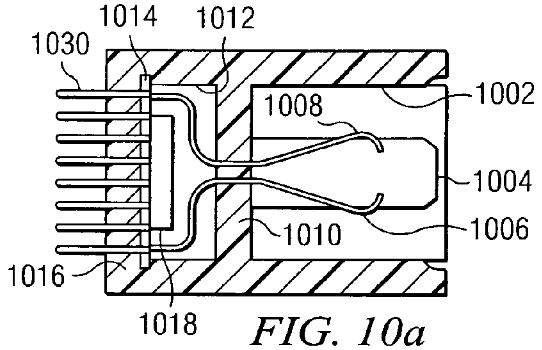
FIGS. 10*a*-10*c* illustrate more detailed views of a vertical series-B receptacle.
Figure 10B:
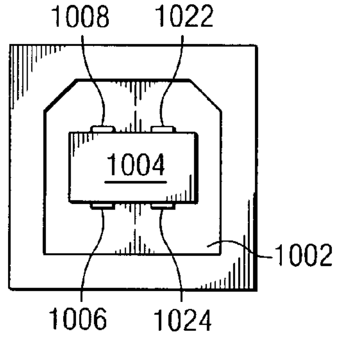
Figure 11A:
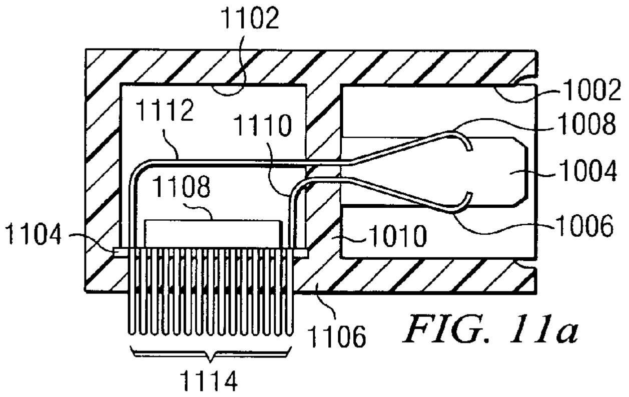
FIGS. 11*a*-11*d* illustrate an alternate embodiment showing a series-B receptacle with a horizontal mounted configuration.
Figure 10C:
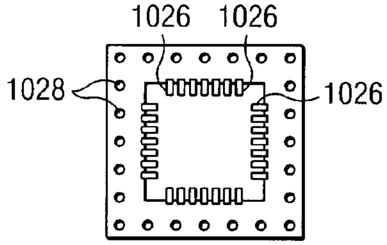

Referring now to FIGS. 10*a*-10*c*, there is illustrated an embodiment for a series B receptacle. This is similar to the embodiment of FIG. 9. In this embodiment, there is illustrated a USB connector comprised of a USB cavity 1002, a protrusion 1004 disposed in the cavity, which protrusion is operable to hold pins 1006 and 1008, it being noted that more than the two pins 1006 and 1008 are contained therein. The cavity 1002 has a back wall 1010 that is shared with a processor cavity 1012. The pins 1006 and 1008 extend through the back wall 1010 and are connected to a PC board 1014 that is disposed upon a back wall 1016 of the processor cavity 1012. The PC board 1014 is operable to contain a processor chip 1018 on the surface thereof. The processor chip 1018 has many connections thereto. Thus, there can be provided a plurality of pins extended from the back wall 1016. This provides a vertical connector.

Referring now to FIG. 10*b*, there is illustrated a front view taken on the input to the cavity 1002. This illustrates that there is an additional pin 1022 on the same side of the protrusion 1004 as the pin 1008, and a second pin 1024 on the same side of the protrusion 1004 as the pin 1006. The connector illustrated in FIG. 10*b* is a series B USB receptacle.

FIG. 10*c* illustrates a top view of the PC board 1018 with the processor chip 1018 disposed thereon. This illustrates a plurality of circuit mounting pads 1026 to allow mounting of the integrated circuit 1018 thereon and a plurality of plated through holes 1028 on the edge thereof which are operable to receive lead connections to the pins 1006, 1008, 1022 and 1024 and also receive interconnection with a plurality of external pins 1030. There are no interconnections between the integrated circuit mounting pads 1026 and the plated through holes 1028 for simplicity purposes.

Referring now to FIGS. 11*a*-11*d*, there are illustrated various views of an alternate embodiment of that illustrated in FIGS. 10*a*-10*c* with a horizontal mounting configuration. In this embodiment, the USB connector portion is identical to that in FIG. 10*a*. However, there is provided adjacent the back wall 1010 of the USB connector housing a processor housing 1102 that contains a PC board on mounting substrate 1104 disposed adjacent a horizontal face 1106. The PC board on mounting substrate 1104 has disposed on the surface thereof a processor chip 1108. Leads 1006 and 1008 are connected to the PC board 1104 through leads 1110 and 1112. There are provided a plurality of interface pins 1114 that extend through the horizontal face 1106 for interface with an external device such as a PC mother board.

Figure 11C:
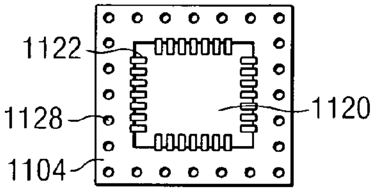
Figure 11B:
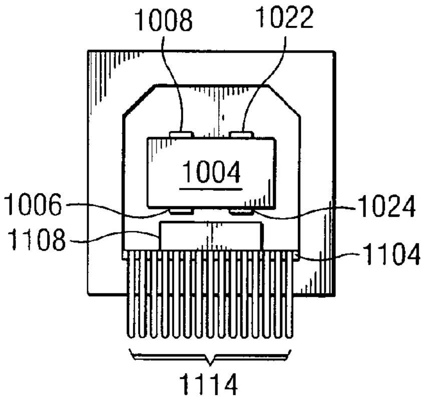

FIG. 11*b* illustrates an end view of the USB connector. This is substantially identical to FIG. 10*b* with the exception that the PC board 1104 is disposed in a horizontal position and the interface pins 1114 extend from the bottom thereof.

Figure 11D:
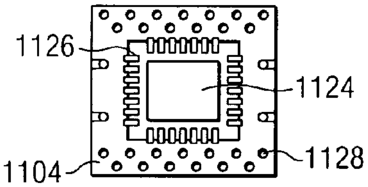

FIGS. 11*c* and 11*d* illustrate a top view of the PC board 1104 with two different configurations for mounting the chip 1108. The PC board 1104 in FIG. 11*c* has a mounting area 1120 disposed thereon with a plurality of mounting pads 1122 disposed thereon. This is a substantially square configuration in this exemplary embodiment. In the illustration in FIG. 11*b*, the PC board has a mounting area 1124 disposed thereon that is rectangular in shape with a plurality of mounting pads 1126 disposed there around. Each of the PC boards 1104 in FIGS. 11*c* and 11*d* have a plurality of plated through holes 1128 disposed around the associated mounting area 1120 or 1124 that allow for interface of one or more of the pins 1114 through the horizontal face 1106. It should be understood, however, that any number of pins from a single pin to multiple pins can be disposed through the horizontal face 1106.

Referring now to FIG. 12, there is illustrated an alternate embodiment illustrating a side sectional view of a series mini-B USB receptacle in a leadless surface mount configuration. The connector portion of the module is comprised of a connector housing 1202 that has disposed therein a protrusion 1204 having illustrated therein one of multiple leads 1206. The leads 1206 are disposed on one side of the protrusion 1204 within the cavity 1202. The rear portion of the module comprises a portion 1208 that is operable to contain a surface mount processor chip 1210. The leads 1206 extend from the upper side of the protrusion 1204 such that only a portion thereof extends above the surface thereof and extends back into the section 1208 and is exposed on the lower side thereof. The processor chip 1210 only has mounting terminals 1212 on the lower surface thereof with an exposed portion 1214 of the leads 1206 being exposed on the lower surface thereof. The entire module is typically "potted."

Figure 14:
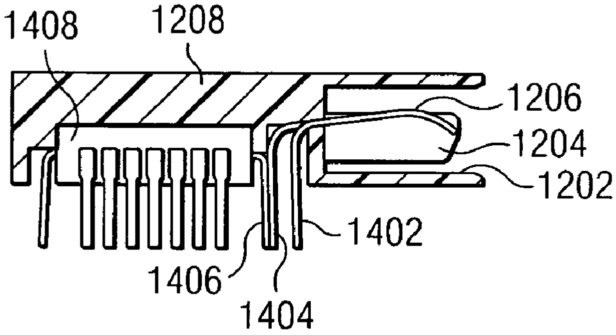
FIG. 14 illustrates a side sectional view of an alternate embodiment of the connector module illustrating a self-contained functionality.

FIG. 14 illustrates the same connector with the exception that a processor chip 1302 is provided that has leads 1304 associated therewith. The processor chip 1302 has the leads thereof configured in the "J-lead" configuration or, alternately, a "gullwing" lead, which one lead 1306 is illustrated. However, typically all the leads are either J-lead or gullwing.

Figure 13:
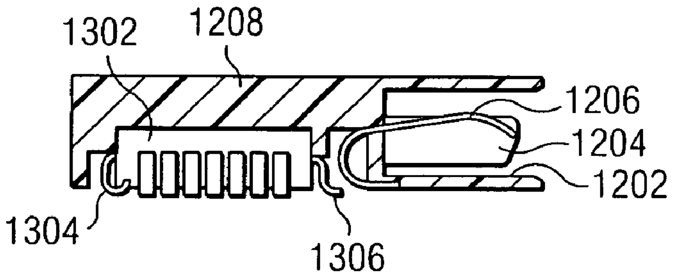
FIG. 13 illustrates a series mini-B USB receptacle with a leaded surface mount configuration.

Referring now to FIG. 14, there is illustrated an even further embodiment of the embodiments of FIGS. 12 and 13 wherein a "through hole" configuration is illustrated. In this illustration, the lead 1206 extends back through the section 1208 and extends downward to provide a through hole pin 1402. Additionally, this extends outward from the package. Additionally, another lead (not shown) that is behind lead 1206 has a portion 1404 illustrated that extends farther back such that it is adjacent a lead 1406 associated with a processor chip 1408 disposed within the section 1208 and having a plurality of leads disposed there through.

It is noted that all these configurations illustrated provide for a USB connector housing having leads associated therewith in accordance with the particular type of a USB connector that extends through a rear wall therein. These leads interface either directly with a processor chip mounted on an interconnecting substrate such as a PC board, the substrate then providing an interface to the exterior or, alternatively, as illustrated in FIGS. 12-14, the processor chip and connector housing with leads are disposed in a potted configuration that can be mounted as a unit on a substrate. The substrate could be a printed circuit or a PC mother board.

Figure 15:
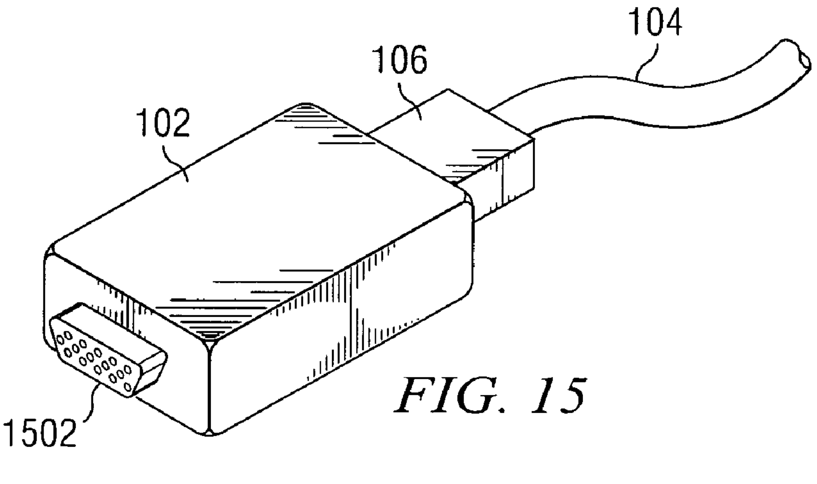
FIGS. 15 and 16 illustrate perspective views of two embodiments of the USB module illustrated as being interconnected with the USB cable.

Referring now to FIG. 15, there is illustrated an embodiment of the module 102 connected to the connector 106 and cable 104. It can be seen in this illustration of FIG. 15 that the module 102 has a transducer 1502 associated with one side thereof. The module 102 thus is merely disposed on the connector 106, or interfaced therewith, that is self contained and operable to provide a mounting surface for the transducer 1502, provide power to the transducer 1502 and also provide processing capability for the transducer 1502.

Figure 16:
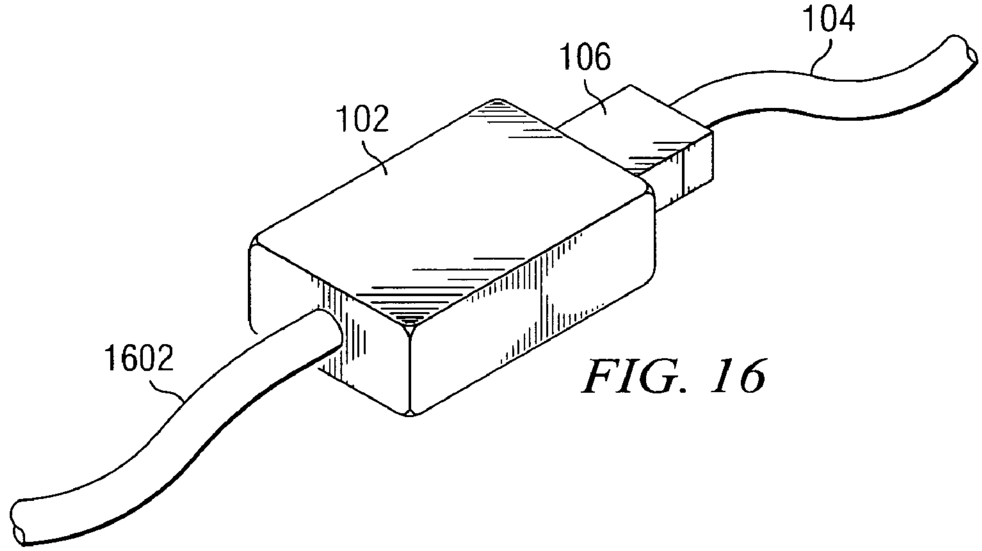

Referring now to FIG. 16, there is illustrated an alternate embodiment wherein the module 102 is operable to provide an interface between the connector 106, which is a USB connector, to a cable 1602 that has other functionality in USB. Thus, the module 102 provides an "in-line" interface/conversion capability.

Figure 17:
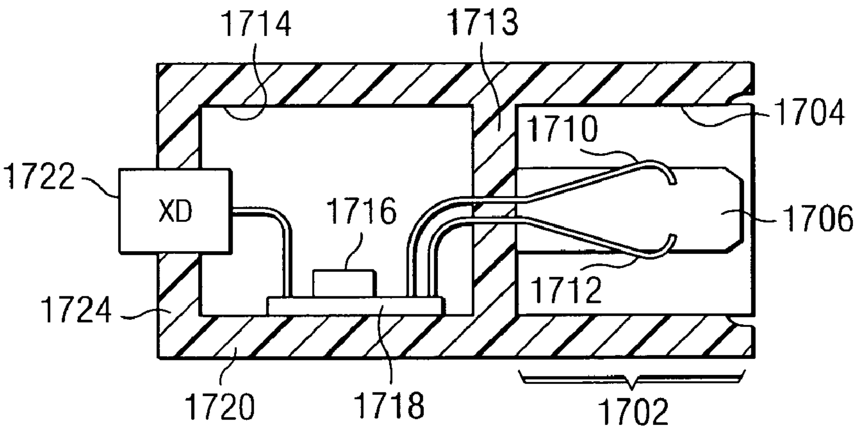
FIG. 17 illustrates a cross-sectional view of the USB module embodiment showing the use of a transducer on one end thereof.

Referring now to FIG. 17, there is illustrated an embodiment of the use of the transducer illustrated in FIG. 15. In the embodiment of FIG. 17, there is illustrated a connector portion 1702 having a connector housing 1704 associated therewith with a protrusion 1706 disposed thereon with associated leads 1710 and 1712. The leads 1710 and 1712 are disposed through a rear wall 1712 of the housing 1704 into a processor housing 1714. A processor chip 1716 is disposed on a substrate 1718 on a side wall 1720 of the module. A transducer 1722 is disposed in a rear wall 1724 of the housing 1714 and interfaced to the PC board 1718. The transducer 1722 receives power, if necessary, from the PC board 1718, which is derived from power pins associated with the USB connector portion 1702. Additionally, data can be transferred to or from the transducer 1722. The transducer 1722 could be as simple as a status LED or, alternatively, it could provide a piezoelectric transducer for audio output or audio input. Further, it could be a photodetector for receiving light input.

Figure 18:
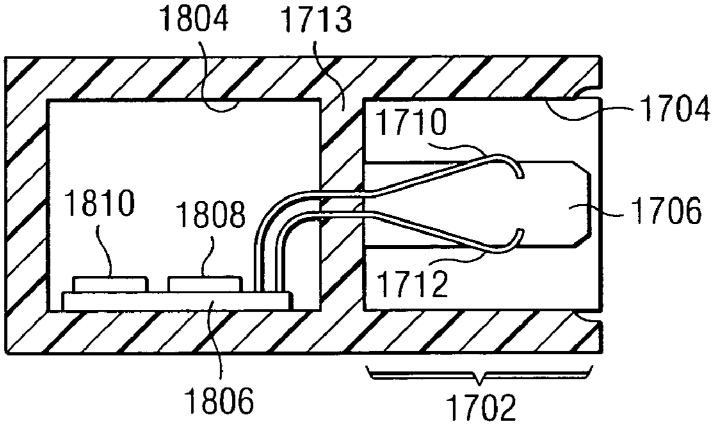
FIG. 18 illustrates an alternate embodiment of the USB module of FIG. 17.

Referring now to FIG. 18, there is illustrated an alternate embodiment of that of FIG. 17. In this embodiment, a processor housing 1802 is provided adjacent the rear wall 1713 of the connector portion 1702. This embodiment does not have any interface with the exterior of the module. Instead, a PC board 1806 is provided that is operable to house a processor chip 1808 and an alternate functional chip 1810. Power is provided to the entire structure on the PC board 1806 to power both the processor 1808 and the alternate functional chip 1810. The alternate functional chip 1810 could be any type of module that requires processing by the processor 1808 to interface the module 1810 with the connector housing 1702. For example, the module 1810 could be a flash memory that might require some type of encrypted interface disposed between the memory and the connector housing for the purpose of access. However, it could provide any other function.

Although the preferred embodiment has been described in detail, it should be understood that various changes, substitutions and alterations can be made therein without departing from the spirit and scope of the invention as defined by the appended claims.

What is claimed is:

1. A modularized serial data module for interfacing with a serial data communication interface to an external device operating in accordance with a first serial data protocol that transmits/receives data and also provides power to the modularized serial data module, comprising:

a connector housing for providing a physical interface with the serial data communication interface;

a processor housing disposed adjacent said connector housing and interfacing therewith;

a single chip processor disposed within said processor housing and operable to be powered by the serial data communication interface through said connector housing and also operable to interface with the data portion of the serial data communication interface through said connector housing, said processor operating with a native digital protocol operating in a first time base;

wherein said single chip processor is operable to provide processing of information based upon data received from the serial data communication interface with the first serial data protocol through said connector housing or processing information with the first serial data protocol for transmission to the serial data communication interface through said connector housing, said first serial data protocol different than said native digital protocol and operating on a second time base different from said first time base such that said transmission is asynchronous, wherein said processor receives the serial data generated with the second time base and converts the data to the native protocol with clock recovery; and said processor having integral therewith a time base referenced to a free running oscillator disposed within said processor housing that requires no external reactive components for the operation thereof, wherein said free running oscillator operates on said first time base which is completely generated on-chip with said single-chip processor, which said oscillator provides an operating clock signal to said processor for operation thereof.

2. The data module of claim 1, and further comprising a data interface between said processor in said processor housing and external to said processor housing for transmission of data from the processor exterior to the processor housing or receipt of data generated exterior to said data housing for processing by the said processor.

3. The data module of claim 2 wherein said data interface comprises an analog interface.

4. The data module of claim 3 wherein said analog interface provides analog output information.

5. The data module of claim 3, wherein said analog interface is operable to receive analog data.

6. The data module of claim 2, wherein said data interface comprises a digital data interface.

7. The data module of claim 6, wherein said digital data interface operates in accordance with a data protocol different than said first serial data protocol.

8. The data module of claim 7, wherein said digital data interface operates in accordance with a second serial data protocol different than said first serial data protocol.

9. The data module of claim 1 and further comprising a transducer disposed in said processing housing for interfacing between said processor and exterior to said processor housing for receipt of external information generated external to said processor housing or providing of information to the exterior of said processor housing, said transducer interfaced with said processor.

10. The data module of claim 9, wherein said transducer is operable to sense exterior information for input to said processor for processing thereof and subsequent transmission to the serial data line through said connector housing.

11. The data module of claim 9, wherein said transducer is operable to generate information for output exterior of said processor housing.

12. The data module of claim 9, wherein said transducer requires power and the power required thereby is provided through said connector housing and said processor housing.

13. The data module of claim 1, wherein the first serial data protocol is a synchronous data protocol.

14. The data module of claim 13, wherein the first serial data protocol is associated with a universal serial bus data protocol.

15. The serial data module of claim 13, wherein said free running time base utilizes a precision oscillator that does not require a crystal time base.

16. A modularized serial data module for interfacing between a first serial data communication interface, operating in accordance with a first serial data protocol, from and to an external device for transmitting and receiving serial data that transmits/receives data and also provides power to the modularized serial data module, and a second serial data communication interface operating in accordance with an associated second serial data protocol that transmits or receives data, comprising:

a connector housing for providing a physical interface with the first serial data communication interface to the external device;

a data interface for providing a physical interface with the second serial data communication interface;

a processor housing disposed adjacent said connector housing and interfacing therewith;

a single chip processor disposed within said processor housing and operable to be powered by the serial data communication interface through said connector housing, and also operable to interface with the data portion of the first serial data communication interface through said connector housing, and to interface with the data portion of the second data communication interface through said data interface, said processor operating with a native digital protocol operating on a first time base;

a free running oscillator disposed within said housing for generating a clock signal operating on said first time base and requiring no external reactive components for the operation thereof; and wherein said single chip processor is operable to provide processing of information based upon data received from either the first serial data communication interface in the first serial data protocol through said connector housing or the second serial data communication interface in the second serial data protocol through said data interface, or processing information for transmission to either the serial data communication interface in the first serial data protocol through said connector housing or the second serial data communication interface in the second serial data protocol through said data interface, said first and second serial data protocol different than said native digital protocol and operating on a second time base different from said first time base such that said transmission is asynchronous, wherein said processor receives the serial data generated with the second time base and converts the data to the native protocol with clock recovery.

17. The data module of claim 16, wherein said data interface comprises an analog interface.

18. The data module of claim 17, wherein said analog interface provides analog output information.

19. The data module of claim 18, wherein said analog interface is operable to receive analog data.

20. The data module of claim 16, wherein said data interface comprises a digital data interface.

21. The data module of claim 20, wherein said digital data interface operates in accordance with said second data protocol different than said first serial data protocol.

22. The data module of claim 16, wherein the first serial data protocol is a synchronous data protocol.

23. The data module of claim 22, wherein the first serial data protocol is associated with a universal serial bus data protocol.

24. The serial data module of claim 23, wherein said processor utilizes a free running time base generated within said connector housing.

25. The serial data module of claim 23, wherein said processor utilizes a free running time base that utilizes a precision oscillator that does not require a crystal time base.

* * * * *